United States Patent
Yun et al.

(10) Patent No.: US 8,284,853 B2
(45) Date of Patent: Oct. 9, 2012

(54) APPARATUS AND METHOD FOR SPATIAL MULTIPLEXING WITH BACKWARD COMPATIBILITY IN A MULTIPLE INPUT MULTIPLE OUTPUT WIRELESS COMMUNICATION SYSTEM

(75) Inventors: Sung-Ryul Yun, Suwon-si (KR); Hak-Ju Lee, Incheon (KR); Dong-Seek Park, Yongin-si (KR); Jae-Yoel Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1239 days.

(21) Appl. No.: 12/042,744

(22) Filed: Mar. 5, 2008

(65) Prior Publication Data
US 2008/0219375 A1    Sep. 11, 2008

(30) Foreign Application Priority Data
Mar. 5, 2007    (KR) .................. 10-2007-0021270

(51) Int. Cl.
*H04B 7/02* (2006.01)
*H04B 7/10* (2006.01)
*H04W 4/00* (2009.01)

(52) U.S. Cl. .................. 375/267; 375/347; 370/332
(58) Field of Classification Search .................. 375/267, 375/347; 370/332
See application file for complete search history.

(56) References Cited

U.S. PATENT DOCUMENTS

| 7,145,940 B2 | 12/2006 | Gore et al. | |
|---|---|---|---|
| 2001/0004585 A1 | 6/2001 | Tsujimoto | |
| 2002/0165626 A1* | 11/2002 | Hammons et al. | 700/53 |
| 2003/0100324 A1 | 5/2003 | Kasapi | |
| 2005/0094740 A1* | 5/2005 | Borran et al. | 375/267 |
| 2005/0124368 A1* | 6/2005 | Diao et al. | 455/522 |
| 2005/0265465 A1* | 12/2005 | Hosur et al. | 375/260 |
| 2006/0088006 A1* | 4/2006 | Chimitt | 370/332 |
| 2007/0041457 A1* | 2/2007 | Kadous et al. | 375/260 |
| 2007/0121753 A1* | 5/2007 | McNamara et al. | 375/267 |
| 2007/0174876 A1* | 7/2007 | Maggio et al. | 725/78 |
| 2007/0230639 A1* | 10/2007 | Stirling-Gallacher | 375/347 |
| 2009/0279486 A1 | 11/2009 | Kishigami et al. | |

FOREIGN PATENT DOCUMENTS

| KR | 10-2005-0087551 A | 8/2005 |
|---|---|---|
| KR | 10-2005-0089698 A | 9/2005 |
| KR | 10-0816500 B1 | 3/2008 |

OTHER PUBLICATIONS

Kamil Bodecek at al., "From Standard Definition to High Definition Migration in Current Digital Video Broadcasting", International Multi-Conference on Computing in the Global Information Technology, Mar. 2007, IEEE.

* cited by examiner

*Primary Examiner* — David C. Payne
*Assistant Examiner* — Sarah Hassan
(74) *Attorney, Agent, or Firm* — Jefferson IP Law, LLP (57) ABSTRACT

An apparatus and method for supporting both a receiver using a single antenna and a receiver using multiple antennas in a Multiple Input Multiple Output (MIMO) wireless communication system are provided. The apparatus and method in a MIMO wireless communication system include a first synthesizer for generating a first Transmit (Tx) signal by adding a first signal and a second signal, a second synthesizer for generating a second Tx signal by subtracting the second signal from the first signal and a plurality of transmitting units for transmitting the first Tx signal and the second Tx signal through corresponding antennas. Accordingly, receivers having either a single antenna or multiple antennas may be employed in the same communication system.

20 Claims, 5 Drawing Sheets

APPARATUS AND METHOD FOR SPATIAL MULTIPLEXING WITH BACKWARD COMPATIBILITY IN A MULTIPLE INPUT MULTIPLE OUTPUT WIRELESS COMMUNICATION SYSTEM

PRIORITY

This application claims the benefit under 35 U.S.C. §119(a) to a Korean patent application filed in the Korean Intellectual Property Office on Mar. 5, 2007 and assigned Serial No. 2007-21270, the entire disclosure of which is hereby incorporated by reference.

BACKGROUND OF THE INVENTION

1. Field of the Invention

The present invention relates to a Multiple Input Multiple Output (MIMO) wireless communication system. More particularly, the present invention relates to an apparatus and method for supporting both a receiver using a single antenna and a receiver using multiple antennas in a MIMO wireless communication system.

2. Description of the Related Art

Recently, with the growing demand for high quality Television (TV) services, much attention is being paid to digital TV broadcasting. One benefit of Digital TV broadcasting is its provision of a higher definition image as compared with conventional analog TV broadcasting. Digital TV broadcasting is classified into Standard Definition (SD) broadcasting and High Definition (HD) broadcasting according to image resolution. Since HD broadcasting provides a high quality TV service having a higher resolution than that of the SD broadcasting, a greater channel capacity is required to provide the HD broadcast. Therefore, in order to provide HD broadcasting using a limited frequency resource, a Multiple Input Multiple Output (MIMO) technique has been considered. That is, by using a plurality of Transmit (Tx) antennas, a broadcasting system can secure the channel capacity required for HD broadcasting.

A receiver having a plurality of Receive (Rx) antennas can receive an HD broadcast that employs the MIMO technique. However, when a receiver having only a single Rx antenna, designed in consideration of only the conventional SD broadcasting, desires to receive an HD broadcast, an antenna for receiving the HD broadcast has to be additionally installed in the receiver. Furthermore, when a transmitter transmits both the SD broadcast signal and the HD broadcast signal by using a Spatial Multiplexing (SM) scheme, which is a MIMO technique, the receiver having the single antenna cannot receive even the SD broadcast.

When a plurality of Rx antennas are provided to receive an HD broadcast signal, successful reception of the HD broadcast signal depends on locations of the antennas. When the Rx antennas are located indoors, it may be difficult to ensure a minimum antenna spacing which is required to use the SM scheme. Further, when the Rx antennas are located indoors, reliability of signal reception may deteriorate due to a low Rx signal strength. On the other hand, when the Rx antennas are located outdoors, an additional cable must be installed to provide a signal path between a receiving device and an antenna. Further, when the Rx antennas are located outdoors, a Line Of Sight (LOS) environment is formed among the Rx antennas, which makes it difficult to obtain a spatial multiplexing gain.

As described above, when the MIMO technique is used for HD broadcasting, there is a problem in that a receiver, which uses the conventional SD broadcasting service and has a single antenna, cannot receive a broadcast signal. In addition, a receiver, which has a plurality of antennas in order to use the HD broadcast service, may not obtain a spatial multiplexing gain depending on an antenna environment. Furthermore, the same problem may occur when the MIMO technique is applied to a communication system in which two or more signals each having differentiated throughput co-exist, similar to a relationship between the SD broadcast signal and the HD broadcast signal in the digital TV broadcast.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting both a receiver using a single antenna and a receiver using multiple antennas in a Multiple Input Multiple Output (MIMO) wireless communication system.

Another aspect of the present invention is to provide an apparatus and method for selecting a signal detection scheme according to a Receive (Rx) antenna environment in a MIMO wireless communication system.

According to an aspect of the present invention, a transmitter apparatus in a MIMO wireless communication system is provided. The apparatus includes a first synthesizer for generating a first Transmit (Tx) signal by adding a first signal and a second signal, a second synthesizer for generating a second Tx signal by subtracting the second signal from the first signal and a plurality of transmitting units for transmitting the first Tx signal and the second Tx signal through corresponding antennas.

According to another aspect of the present invention, a receiver apparatus in a MIMO wireless communication system is provided. The apparatus includes an estimator for estimating a channel for each antenna between the receiver and a transmitter, a determining unit for determining whether a channel environment between a first Rx antenna and the transmitter is a Line Of Sight (LOS) environment by using information on the channel, an LOS detector for detecting a first signal from a signal received through the first Rx antenna when the channel environment between the first Rx antenna and the transmitter is the LOS environment, and for detecting a second signal according to a Successive Interference Cancellation (SIC) scheme and a Non Line Of Sight (NLOS) detector for detecting the first signal and the second signal from signals received through the first Rx antenna and a second Rx antenna according to a Zero Forcing (ZF) scheme, when the channel environment between the first Rx antenna and the transmitter is an NLOS environment.

According to another aspect of the present invention, a signal transmission method of a transmitter in a MIMO wireless communication system is provided. The method includes generating a first Tx signal by adding a first signal and a second signal, generating a second Tx signal by subtracting the second signal from the first signal and transmitting the first Tx signal and the second Tx signal through corresponding antennas.

According to another aspect of the present invention, a signal detection method of a receiver in a MIMO wireless communication system is provided. The method includes estimating a channel for each antenna between the receiver and a transmitter, determining whether a channel environment between a first Rx antenna and the transmitter is an LOS environment by using information on the channel, detecting a first signal from a signal received through the first Rx antenna when the channel environment between the first Rx antenna and the transmitter is the LOS environment and detecting a second signal according to an SIC scheme, and detecting the first signal and the second signal from signals received through the first Rx antenna and a second Rx antenna according to a ZF scheme, when the channel environment between the first Rx antenna and the transmitter is an NLOS environment.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a technique of an exemplary embodiment of the present invention will be described which supports both a receiver using a single antenna and a receiver using multiple antennas in a Multiple Input Multiple Output (MIMO) wireless communication system.

Although a digital TeleVision (TV) broadcast service system is described in the present invention as an example, the present invention may also apply to other wireless communication systems as long as two or more signals each having differentiated throughput co-exist, such as a Standard Definition (SD) broadcast signal and a High Definition (HD) broadcast signal in the digital TV system. In the following descriptions, the SD broadcast signal will be referred to as a basic signal or a first signal, and the HD broadcast signal will be referred to as an enhanced signal or a second signal.

Now, a structure of a receiver, which has a plurality of Receive (Rx) antennas, and a signal detection scheme will be described in brief according to an exemplary embodiment of the present invention.

For ease of description only, it will be assumed hereinafter that two Rx antennas are used in the present invention, and the receiver is a fixed receiver located indoors. One of the two Rx antennas of the receiver is located outdoors, and is connected to the receiver through a separate cable. The other Rx antenna is installed directly to the receiver, and is located indoors. Optionally, the outdoor antenna and a transmitter may form a Line Of Sight (LOS) environment.

If an LOS environment is formed between the outdoor antenna and the transmitter, the receiver can improve a reception throughput by using a Successive Interference Cancellation (SIC) scheme. Specifically, when a signal is received through an antenna which is in an LOS environment, the signal is detected in a relatively simple manner and the detected signal is relatively correct. Thus, the receiver first detects the signal received through the antenna which is in the LOS environment, and then detects a signal received through the other antenna. In this case, the transmitter transmits a signal having a format designed to allow simple detection of the signal in the LOS environment. The signal format will be described below in detail together with the transmitter. On the other hand, when a Non Line Of Sight (NLOS) environment is formed between the outdoor antenna and the transmitter, the receiver detects a signal by using a general MIMO reception scheme such as a Zero Forcing (ZF) scheme.

Figure 1:
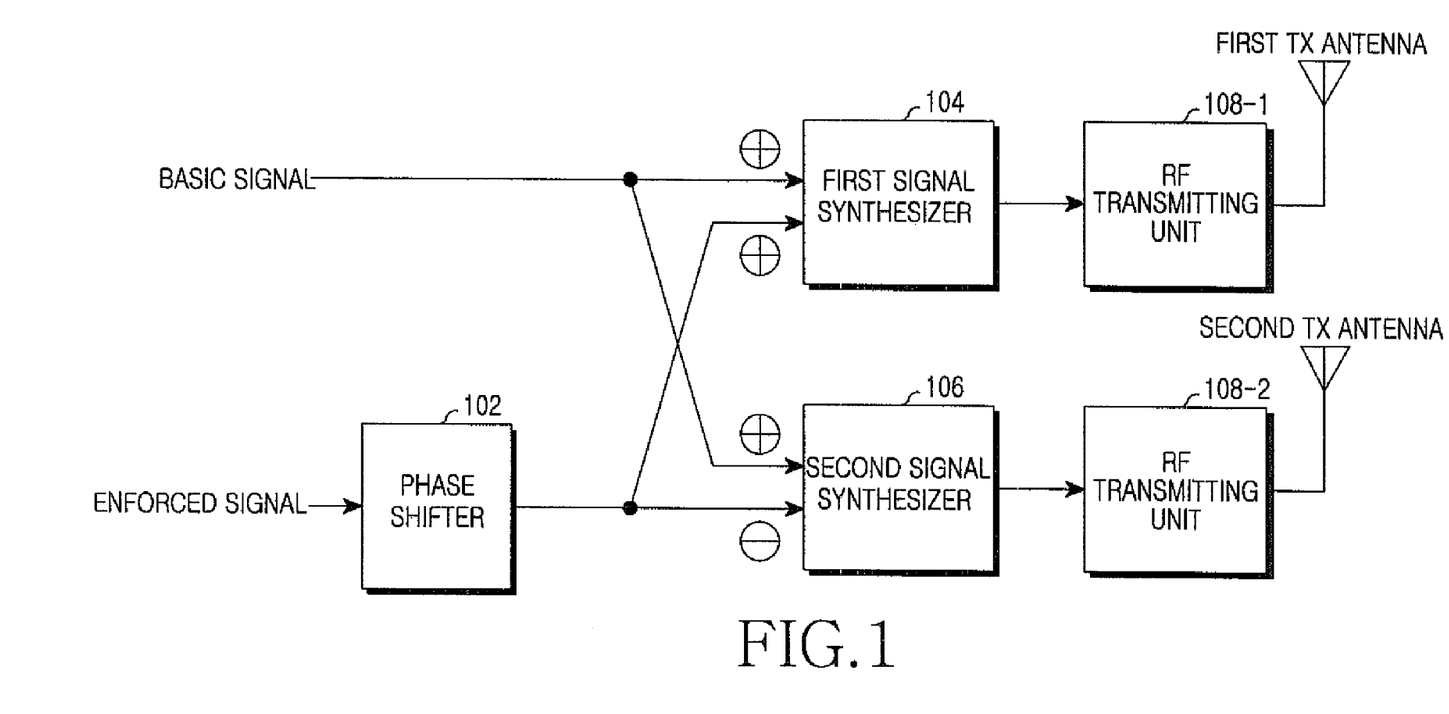
FIG. 1 is a block diagram illustrating a transmitter in a Multiple Input Multiple Output (MIMO) wireless communication system according to an exemplary embodiment of the present invention.

FIG. 1 is a block diagram illustrating a transmitter in a MIMO wireless communication system according to an exemplary embodiment of the present invention.

Referring to FIG. 1, the transmitter includes a phase shifter 102, a first signal synthesizer 104, a second signal synthesizer 106, and a plurality of Radio Frequency (RF) transmitting units 108-1 to 108-2.

The phase shifter 102 shifts a phase of an enforce signal by a specific value. The first signal synthesizer 104 generates a signal to be transmitted to a first Transmit (Tx) antenna by adding a basic signal and the phase-shifted enforced signal. The second signal synthesizer 106 generates a signal to be transmitted to a second Tx antenna by subtracting the phase-shifted enhanced signal from the basic signal. The signals output from the first signal synthesizer 104 and the second signal synthesizer 106 can be expressed by Equation (1) below.

$$s_1 = x_1 + e^{j\theta} x_2$$

$$s_2 = x_1 - e^{j\theta} x_2 \quad (1)$$

In Equation (1), $s_1$ denotes the output of the first signal synthesizer 104, $s_2$ denotes the output of the second signal synthesizer 106, $x_1$ denotes the basic signal, $x_2$ denotes the enforce signal, and $\theta$ denotes the phase shifted by the phase shifter 102.

When the signals generated respectively from the first signal synthesizer 104 and the second signal synthesizer 106 are received by using one antenna, a receiver obtains only the basic signal since the enforced signal is offset.

The plurality of RF transmitting units 108-1 to 108-2 convert and amplify the signals respectively provided from the first signal synthesizer 104 and the second signal synthesizer 106 into RF signals, and then transmit the RF signals through corresponding antennas.

Figure 2:
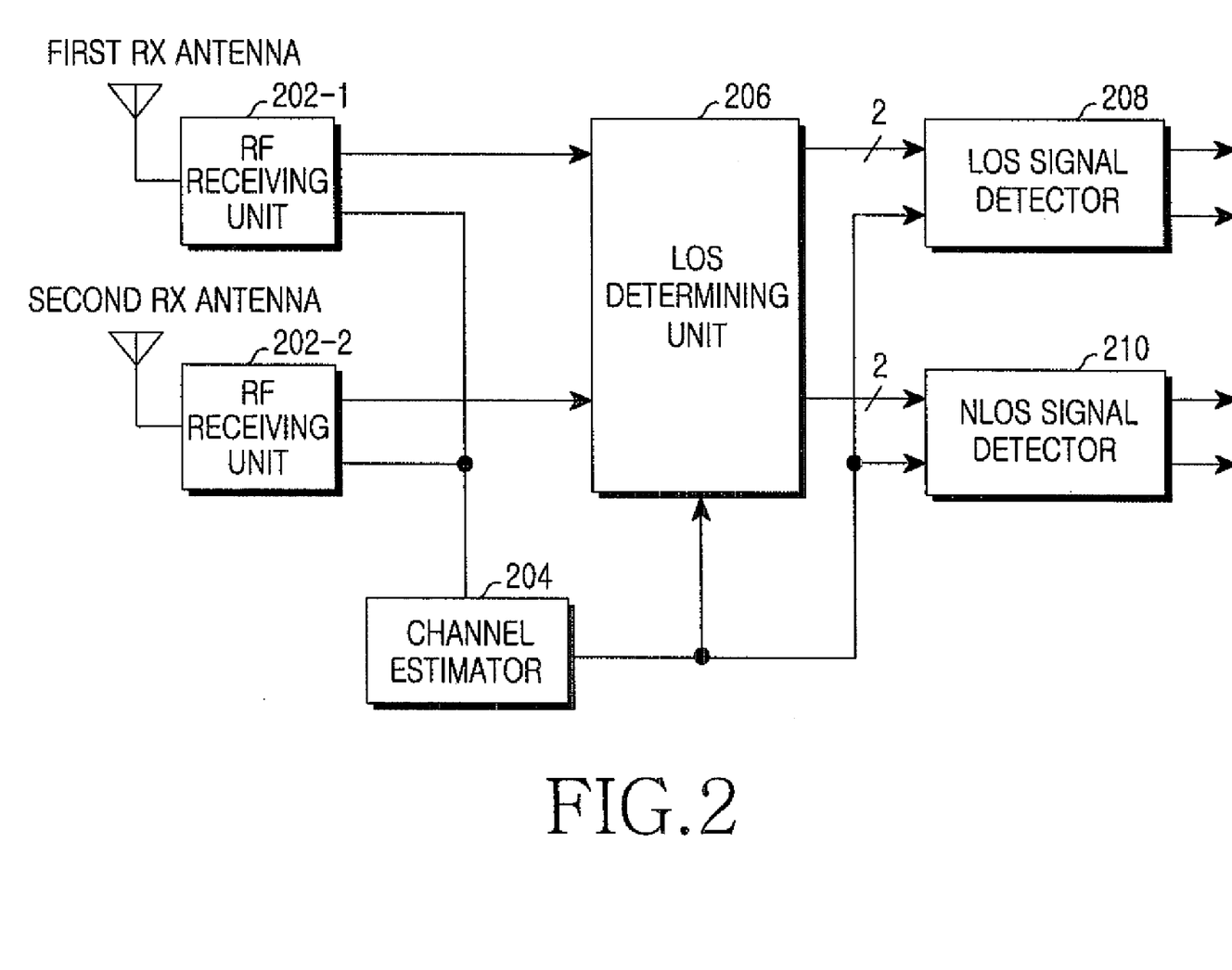
FIG. 2 is a block diagram illustrating a receiver in a MIMO wireless communication system according to an exemplary embodiment of the present invention.

FIG. 2 is a block diagram illustrating a receiver in a MIMO wireless communication system according to an exemplary embodiment of the present invention.

Referring to FIG. 2, the receiver includes a plurality of RF receiving units 202-1 to 202-2, a channel estimator 204, an LOS determining unit 206, an LOS signal detector 208, and an NLOS signal detector 210.

The RF receiving units 202-1 to 202-2 convert RF signals respectively received through a first Rx antenna and a second Rx antenna into baseband signals. In this case, the signals received through the first Rx antenna and the second Rx antenna can be expressed by Equation (2) below.

$$\begin{bmatrix} r_1 \\ r_2 \end{bmatrix} = H \begin{bmatrix} x_1 + e^{j\theta} x_2 \\ x_1 - e^{j\theta} x_2 \end{bmatrix} + \begin{bmatrix} n_1 \\ n_2 \end{bmatrix}, \text{ where } H = \begin{bmatrix} h_{11} & h_{12} \\ h_{21} & h_{22} \end{bmatrix}, \quad (2)$$

$$= H \begin{bmatrix} 1 & e^{j\theta} \\ 1 & -e^{j\theta} \end{bmatrix} \begin{bmatrix} x_1 \\ x_2 \end{bmatrix} + \begin{bmatrix} n_1 \\ n_2 \end{bmatrix}$$

In Equation (2), $r_1$ denotes the signal received through the first Rx antenna, $r_2$ denotes the signal received through the second Rx antenna, H denotes a channel matrix between a transmitter and the receiver, $x_1$ denotes a basic signal, $x_2$ denotes an enforced signal, $\theta$ denotes a phase-shift value for the enforced signal, $n_1$ denotes a noise for the first Rx antenna, $n_2$ denotes a noise for the second Rx antenna, $h_{11}$ denotes a channel between the first Rx antenna and a first Tx antenna, $h_{12}$ denotes a channel between the first Rx antenna and a second Tx antenna, $h_{21}$ denotes a channel between the second Rx antenna and the first Tx antenna, and $h_{22}$ denotes a channel between the second Rx antenna and the second Tx antenna.

The channel estimator 204 estimates a channel for each antenna between the transmitter and the receiver. Formation of the estimated channel consists of a channel matrix having a size of {the number of Tx antennas}×{the number of Rx antennas} as expressed by Equation (2) above. The LOS determining unit 206 determines whether a channel environment between one of the two Rx antennas of the receiver and the transmitter is an LOS environment. For example, in the determination process, the LOS determining unit 206 may use a condition number of a channel matrix calculated by Equation (3) below.

$$\text{Condition Number} = \frac{\lambda_{MAX}(H)}{\lambda_{min}(H)} \quad (3)$$

In Equation (3), H denotes a channel matrix estimated by the channel estimator 204, $\lambda_{MAX}(H)$ denotes a maximum singular value of the channel matrix, and $\lambda_{min}(H)$ denotes a minimum singular value of the channel matrix.

If the condition number is greater than a threshold, the LOS determining unit 206 determines that the channel environment between one Rx antenna and the transmitter is an LOS environment, and outputs to the LOS signal detector 208 the Rx signals received from the RF receiving units 202-1 to 202-2. Otherwise, if the condition number is less than or equal to the threshold, the LOS determining unit 206 determines that the channel environment between one Rx antenna and the transmitter is an NLOS environment, and outputs to the NLOS signal detector 210 the Rx signals received from the RF receiving units 202-1 to 202-2.

Figure 3A:
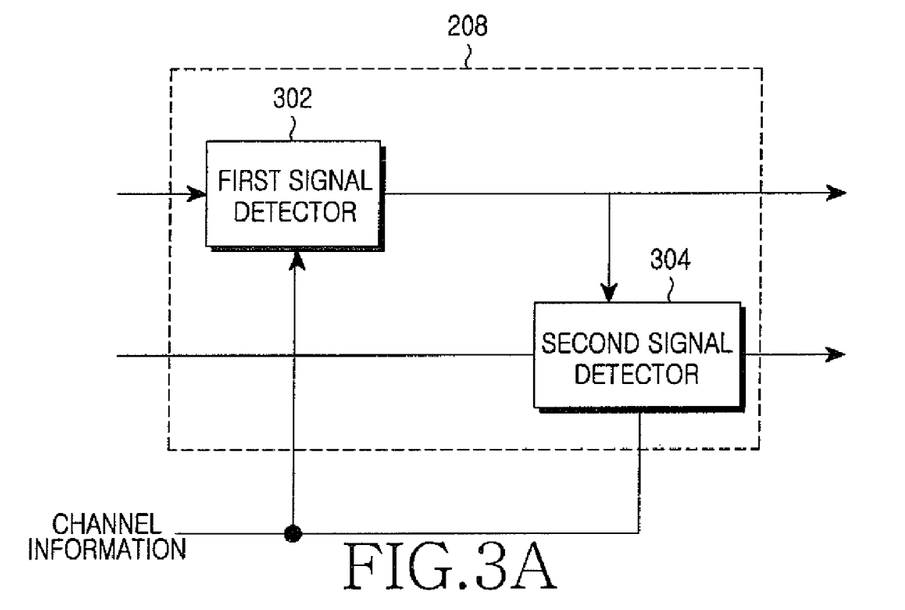
FIGS. 3A and FIGS. 3B are block diagrams illustrating a signal detector of a receiver in a MIMO wireless communication system according to an exemplary embodiment of the present invention.

The LOS signal detector 208 performs a signal detection process when an LOS environment is formed with respect to the transmitter. In an exemplary embodiment as illustrated in FIG. 3A, the LOS signal detector 208 includes a first signal detector 302 and a second signal detector 304. The first signal detector 302 detects a basic signal from a signal received through an antenna which is in the LOS environment. In this case, when the antenna which is in the LOS environment is the first Rx antenna, the signal received through the first Rx antenna can be expressed by Equation (4) below.

$$r_1 = h_{11}(x_1 + e^{j\theta} x_2) + h_{12}(x_1 - e^{j\theta} x_2) + n_1 \quad (4)$$

$$= 2h_{11}x_1 + n_1$$

In Equation (4), $r_1$ denotes the signal received through the first Rx antenna, $h_{11}$ denotes the channel between the first Rx antenna and the first Tx antenna, $h_{12}$ denotes the channel between the first Rx antenna and the second Tx antenna, $x_1$ denotes the basic signal, $x_2$ denotes the enforced signal, $\theta$ denotes the phase-shift value for the enforced signal, and $n_1$ denotes the noise for the first Rx antenna.

That is, from the view point of the first Rx antenna, the channel with respect to the first Tx antenna is almost the same as the channel with respect to the second Tx antenna. Therefore, the signal received through the first Rx antenna can be expressed by Equation (4) above. The first signal detector 302 can simply detect the basic signal according to Equation (5) below.

$$\hat{x}_1 = r_1/2h_{11} \quad (5)$$

In Equation (5), $x_1$ denotes the detected basic signal, $r_1$ denotes the signal received through the first Rx antenna, and $h_{11}$ denotes the channel between the first Rx antenna and the first Tx antenna.

When the basic signal is detected by the first signal detector 302, the second signal detector 304 eliminates an interference component caused by the basic signal from the signal received through the second Rx antenna by using Equation (6) below, and then detects the enforced signal by using Equation (7) below.

$$r_2 - (h_{21} + h_{22})x_1 = h_{21}(x_1 + e^{j\theta} x_2) + h_{22}(x_1 - e^{j\theta} x_2) + \quad (6)$$

$$n_2 - (h_{21} + h_{22})x_1$$

$$e^{j\theta}(h_{21} - h_{22})x_2 + n_2$$

In Equation (6), $r_2$ denotes the signal received through the second Rx antenna, $h_{21}$ denotes the channel between the second Rx antenna and the first Tx antenna, $h_{22}$ denotes the channel between the second Rx antenna and the second Tx antenna, xi denotes the basic signal, $x_2$ denotes the enforced signal, $\theta$ denotes the phase-shift value for the enforced signal, and $n_2$ denotes the noise for the second Rx antenna.

$$\hat{x}_2 = r_2'/e^{j\theta}(h_{21} - h_{22}) \quad (7)$$

In Equation (7), $\hat{x}_2$ denotes the detected enforced signal, $r_2'$ denotes the signal obtained by eliminating the influence of the basic signal from the signal received through the second Rx antenna, $h_{21}$ denotes the channel between the second Rx antenna and the first Tx antenna, $h_{22}$ denotes the channel between the second Rx antenna and the second Tx antenna, and θ denotes the phase-shift value for the enforced signal.

That is, the LOS signal detector 208 first detects the basic signal by the use of the first signal detector 302, and thereafter, according to the SIC scheme, the LOS signal detector 208 detects the enforced signal with the second signal detector 304 by using the basic signal detected by the first signal detector 302.

Figure 3B:
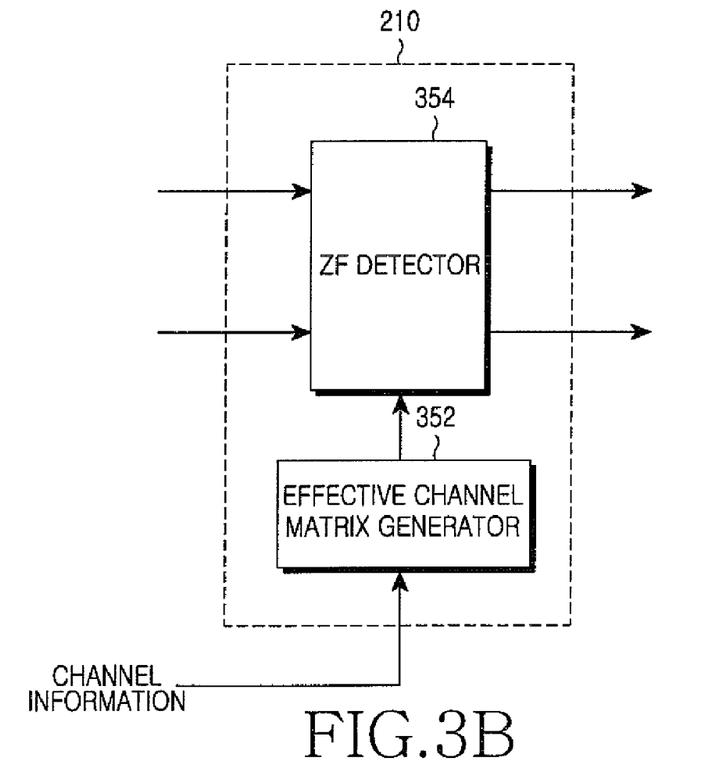

The NLOS signal detector 210 performs the signal detection process when an NLOS environment is formed with respect to the transmitter. In an exemplary embodiment as illustrated in FIG. 3B, the NLOS signal detector 210 includes an effective channel matrix generator 352 and a ZF detector 354. The effective channel matrix generator 352 receives a channel matrix from the channel estimator 204, and generates an effective channel matrix as expressed by Equation (8) below.

$$H \begin{bmatrix} 1 & e^{j\theta} \\ 1 & -e^{j\theta} \end{bmatrix} \quad (8)$$

In Equation (8), H denotes the channel matrix estimated by the channel estimator 204, and θ denotes the phase-shift value for the enforced signal. Herein, since the phase-shift value is predetermined between the transmitter and the receiver, the effective channel matrix generator 352 can know the phase-shift value.

The ZF detector 354 receives the effective channel matrix from the effective channel matrix generator 352, and detects the basic signal and the enforced signal from the Rx signal as expressed by Equation (2) above by using the ZF scheme. That is, the ZF detector 354 regards the effective channel matrix as a channel with respect to the transmitter, and thus applies the ZF scheme to the Rx signals. Accordingly, the ZF detector 354 can immediately detect the basic signal and the enforced signal.

Although not shown in FIG. 2, the receiver may also include a mode selector for switching a reception mode and may also include a basic mode detector. The reception mode may be either a basic mode or an enforced mode. When in the basic mode, the receiver detects only the basic signal. That is, the mode selector provides a signal received through one antenna to the basic mode detector, and the basic mode detector detects the basic signal from the provided signal. On the other hand, when in the enforced mode, the receiver detects both the basic signal and the enforced signal by using the elements shown in FIG. 2.

Figure 4:
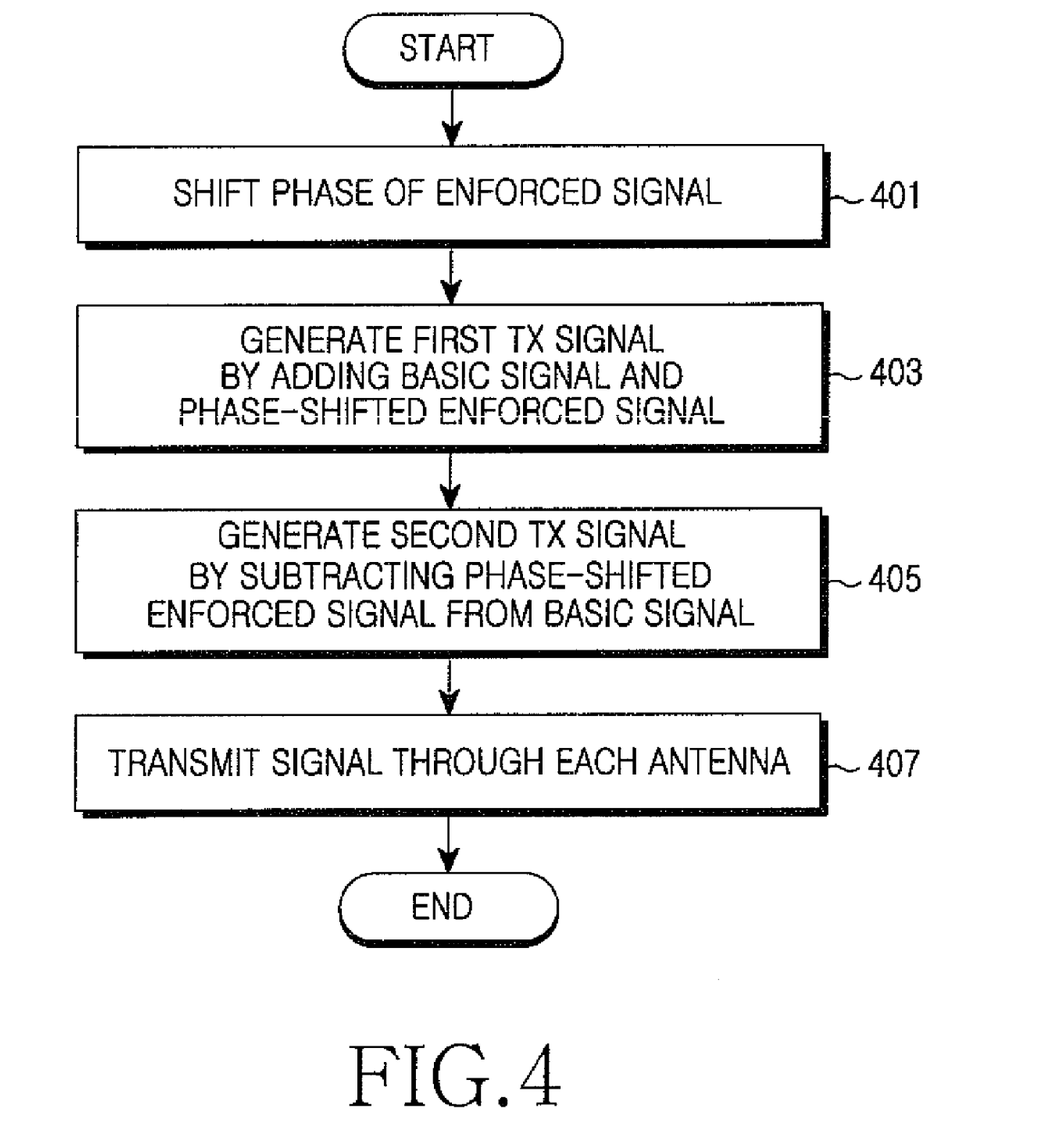
FIG. 4 is a flowchart illustrating a signal transmission process of a transmitter in a MIMO wireless communication system according to an exemplary embodiment of the present invention.

FIG. 4 is a flowchart illustrating a signal transmission process of a transmitter in a MIMO wireless communication system according to an exemplary embodiment of the present invention.

Referring to FIG. 4, the transmitter shifts a phase of an enforced signal by a specific value in step 401. In an exemplary implementation, the specific value may be predetermined between the transmitter and a receiver.

In step 403, the transmitter generates a first Tx signal by adding a basic signal and the phase-shifted enforced signal. That is, the same signal as the signal $s_1$ of Equation (1) above is generated.

In step 405, the transmitter generates a second Tx signal by subtracting the phase-shifted enforced signal from the basic signal. That is, the same signal as the signal $s_2$ of Equation (1) above is generated.

In step 407, the transmitter transmits the first Tx signal and the second Tx signal to the receiver through corresponding antennas.

Figure 5:
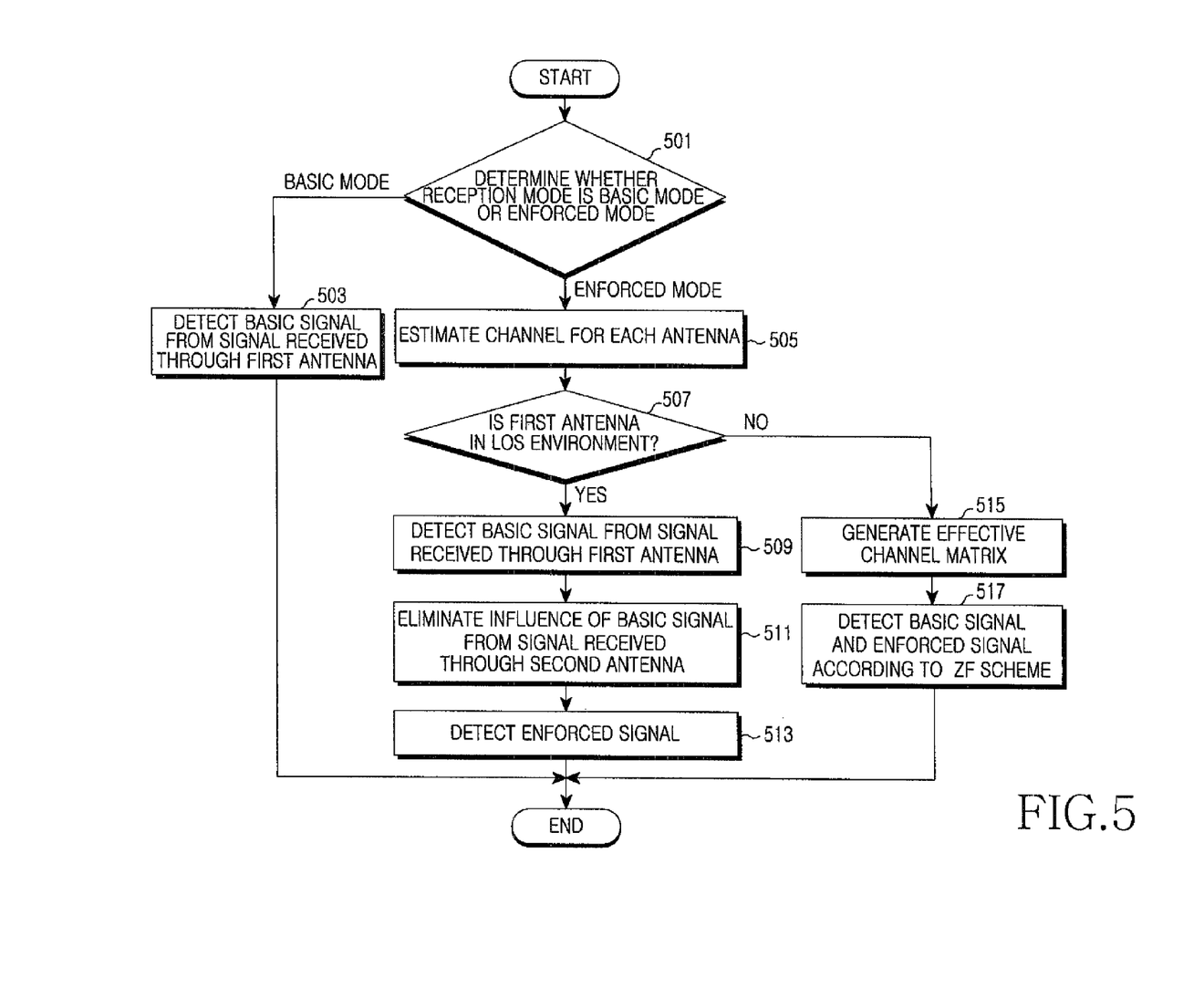
FIG. 5 is a flowchart illustrating a signal reception process of a receiver in a MIMO wireless communication system according to an exemplary embodiment of the present invention.

FIG. 5 is a flowchart illustrating a signal reception process of a receiver in a MIMO wireless communication system according to an exemplary embodiment of the present invention.

Referring to FIG. 5, the receiver determines whether a reception mode is a basic mode or an enforced mode in step 501.

If the reception mode is the basic mode, the receiver detects a basic signal from a signal received through a first Rx antenna in step 503.

Otherwise, if the reception mode is the enforced mode, the receiver estimates a channel for each antenna in step 505. Herein, information on the estimated channel consists of a channel matrix having a size of {the number of Tx antennas}× {the number of Rx antennas} as expressed by Equation (2) above.

In step 507, the receiver determines whether the first Rx antenna is in an LOS environment with respect to a transmitter. That is, the receiver calculates a condition number by using the channel information by using Equation (3) above, and, if the condition number is greater than a threshold, determines that a channel environment is an LOS environment.

If the first Rx antenna is in an LOS environment, the receiver detects the basic signal from a signal received through the first Rx antenna in step 509 by using Equation (5) above.

In step 511, the receiver eliminates an influence of the basic signal from a signal received through a second Rx antenna by using Equation (6) above.

In step 513, the receiver detects an enforced signal by using Equation (7) above. That is, if the first Rx antenna is in the LOS environment, the receiver detects the basic signal through steps 509 to 513, and detects the enforced signal by using the SIC scheme.

If the determination result of step 507 indicates that the first Rx antenna is in an NLOS environment, the receiver generates an effective channel matrix as expressed by Equation (8) above by using the channel information in step 515.

In step 517, the receiver detects the basic signal and the enforced signal according to the ZF scheme. That is, the receiver regards the effective channel matrix as a channel with respect to the transmitter, and thus applies the ZF scheme to Rx signals. As a result, the receiver can immediately detect the basic signal and the enforced signal.

According to exemplary embodiments of the present invention, when two or more signals each having differentiated throughput co-exist in a MIMO wireless communication system, a transmitter transmits signals after synthesizing the signals as described above, and a receiver detects the signals according to an antenna environment. Therefore, a system can maintain mutual compatibility between a receiver using a single antenna and a receiver using multiple antennas, and also can provide a service by the use of a signal having an improved throughput.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A receiver apparatus in a Multiple Input Multiple Output (MIMO) wireless communication system, the apparatus comprising:
    an estimator for estimating a channel for each antenna between the receiver and a transmitter;
    a determining unit for determining whether a channel environment between a first Receive (Rx) antenna and the transmitter comprises a Line Of Sight (LOS) environment by using information on the channel;
    an LOS detector for detecting a first signal from a signal received through the first Rx antenna when the channel environment between the first Rx antenna and the transmitter comprises the LOS environment, and for detecting a second signal according to a Successive Interference Cancellation (SIC) scheme; and
    a Non Line Of Sight (NLOS) detector for detecting the first signal and the second signal from signals received through the first Rx antenna and a second Rx antenna according to a Zero Forcing (ZF) scheme, when the channel environment between the first Rx antenna and the transmitter comprises an NLOS environment.

2. The apparatus of claim 1, wherein the first signal and the second signal are provided for the same service, and further wherein the second signal is provided for a higher quality service than the first signal.

3. The apparatus of claim 2, wherein the first signal comprises a Standard Definition (SD) broadcast signal for digital TeleVision (TV) broadcasting, and the second signal is a High Definition (HD) broadcast signal for the digital TV broadcasting.

4. The apparatus of claim 1, wherein the determining unit determines that the channel environment between the first Rx antenna and the transmitter comprises the LOS environment if a result of the following Equation is greater than a threshold:

$$\text{Condition Number} = \frac{\lambda_{MAX}(H)}{\lambda_{min}(H)},$$

where H denotes a channel matrix estimated by the estimator, $\lambda_{MAX}(H)$ denotes a maximum singular value of the channel matrix, and $\lambda_{min}(H)$ denotes a minimum singular value of the channel matrix.

5. The apparatus of claim 1, wherein the LOS detector comprises a first signal detector for detecting the first signal by using Equation:

$$r_1/2h_{11},$$

where $r_1$ denotes the signal received through the first Rx antenna, and $h_{11}$ denotes a channel between the first Rx antenna and a first Transmit (Tx) antenna.

6. The apparatus of claim 5, wherein the LOS detector comprises a second signal detector for eliminating an influence of the first signal from the signal received through the second Rx antenna by using Equation:

$$r_2-(h_{21}+h_{22})x_1,$$

where $r_2$ denotes the signal received through the second Rx antenna, $h_{21}$ denotes a channel between the second Rx antenna and the first Tx antenna, $h_{22}$ denotes a channel between the second Rx antenna and a second Tx antenna, and $x_1$ denotes a basic signal.

7. The apparatus of claim 6, wherein the second signal detector detects the second signal by using Equation:

$$r_2'/e^{j\theta}(h_{21}-h_{22})$$

where $r_2'$ denotes a signal obtained by eliminating an influence of the basic signal from the signal received through the second Rx antenna, $h_{21}$ denotes the channel between the second Rx antenna and the first Tx antenna, $h_{22}$ denotes the channel between the second Rx antenna and the second Tx antenna, and $\theta$ denotes a phase-shift value for an enforced signal.

8. The apparatus of claim 1, wherein the NLOS detector comprises a generator for generating an effective channel matrix as expressed by Equation:

$$H \begin{bmatrix} 1 & e^{j\theta} \\ 1 & -e^{j\theta} \end{bmatrix},$$

where H denotes a channel matrix estimated by the estimator, and $\theta$ denotes a phase-shift value for an enforced signal.

9. The apparatus of claim 8, wherein the phase-shift value comprises predetermined between the transmitter and the receiver.

10. The apparatus of claim 8, wherein the NLOS detector regards the effective channel matrix as the channel between the transmitter and the receiver, and applies the ZF scheme to the signals received through the respective Rx antennas to detect the first signal and the second signal.

11. A signal detection method of a receiver in a wireless communication system, the method comprising:
    estimating a channel for each antenna between the receiver and a transmitter;
    determining whether a channel environment between a first Receive (Rx) antenna and the transmitter comprises a Line Of Sight (LOS) environment by using information on the channel;
    detecting a first signal from a signal received through the first Rx antenna when the channel environment between the first Rx antenna and the transmitter is the LOS environment, and detecting a second signal according to a Successive Interference Cancellation (SIC) scheme; and
    detecting the first signal and the second signal from signals received through the first Rx antenna and a second Rx antenna according to a Zero Forcing (ZF) scheme, when the channel environment between the first Rx antenna and the transmitter comprises a Non Line Of Sight (NLOS) environment.

12. The method of claim 11, wherein the first signal and the second signal are provided for the same service, and further wherein the second signal is provided for a higher quality service than the first signal.

13. The method of claim 12, wherein the first signal comprises a Standard Definition (SD) broadcast signal for digital TeleVision (TV) broadcasting, and the second signal comprises a High Definition (HD) broadcast signal for the digital TV broadcasting.

14. The method of claim 11, wherein the determining whether the channel environment between the first Rx antenna and the transmitter comprises the LOS environment comprises determining if a result of the following Equation is greater than a threshold:

$$\text{Condition Number} = \frac{\lambda_{MAX}(H)}{\lambda_{min}(H)},$$

where H denotes a channel matrix estimated in the channel estimation step, $\lambda_{MAX}(H)$ denotes a maximum singular value of the channel matrix, and $\lambda_{min}(H)$ denotes a minimum singular value of the channel matrix.

15. The method of claim 11, wherein, if the channel environment between the first Rx antenna and the transmitter comprises the LOS environment, the first signal is detected by using Equation:

$$r_1/2h_{11},$$

where $r_1$ denotes the signal received through the first Rx antenna, and $h_{11}$ denotes a channel between the first Rx antenna and a first Transmit (Tx) antenna.

16. The method of claim 11, wherein, if the channel environment between the first Rx antenna and the transmitter is the LOS environment, eliminating an influence of the first signal by using Equation:

$$r_2 - (h_{21} + h_{22})x_1,$$

where $r_2$ denotes the signal received through the second Rx antenna, $h_{21}$ denotes a channel between the second Rx antenna and the first Tx antenna, $h_{22}$ denotes a channel between the second Rx antenna and a second Tx antenna, and $x_1$ denotes a basic signal.

17. The method of claim 16, wherein, if the channel environment between the first Rx antenna and the transmitter is the LOS environment, the detecting of the second signal comprises detecting by using Equation:

$$r_2'/e^{j\theta}(h_{21} - h_{22}),$$

where $r_2'$ denotes a signal obtained by eliminating an influence of the basic signal from the signal received through the second Rx antenna, $h_{21}$ denotes the channel between the second Rx antenna and the first Tx antenna, $h_{22}$ denotes the channel between the second Rx antenna and the second Tx antenna, and $\theta$ denotes a phase-shift value for an enforced signal.

18. The method of claim 11, wherein, if the channel environment between the first Rx antenna and the transmitter is the NLOS environment, the determining of the first signal and the second signal comprises generating an effective matrix channel as expressed by Equation:

$$H\begin{bmatrix} 1 & e^{j\theta} \\ 1 & -e^{j\theta} \end{bmatrix},$$

where H denotes a channel matrix estimated by the channel estimator, and $\theta$ denotes a phase-shift value for an enforced signal.

19. The method of claim 18, wherein the phase-shift value comprises a value predetermined between the transmitter and the receiver.

20. The method of claim 18, wherein, if the channel environment between the first Rx antenna and the transmitter is the NLOS environment, the determining of the first signal and the second signal comprises applying the ZF scheme to the signals received through the respective Rx antennas by regarding the effective channel matrix as the channel between the transmitter and the receiver.

* * * * *